O. C. RITZ-WOLLER.
GASOLENE FEED SYSTEM FOR MOTOR VEHICLES.
APPLICATION FILED APR. 19, 1913.
1,097,365.
Patented May 19, 1914.
2 SHEETS—SHEET 1.
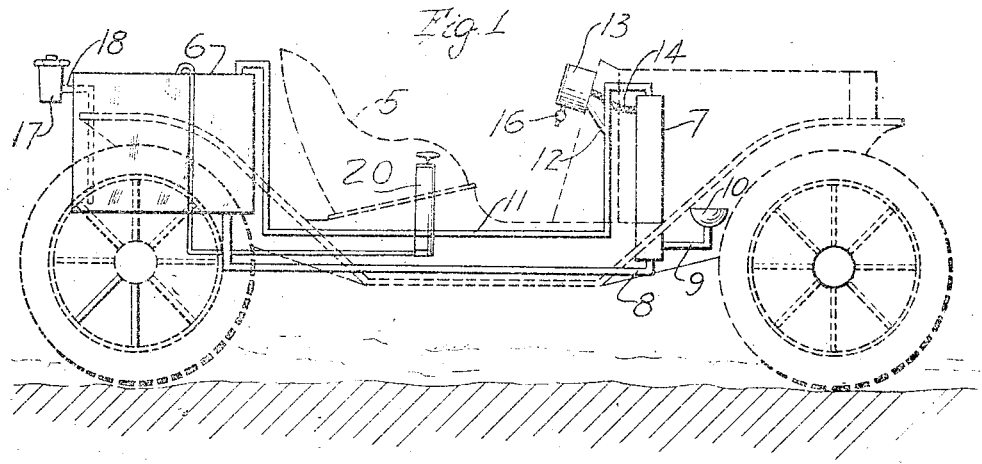
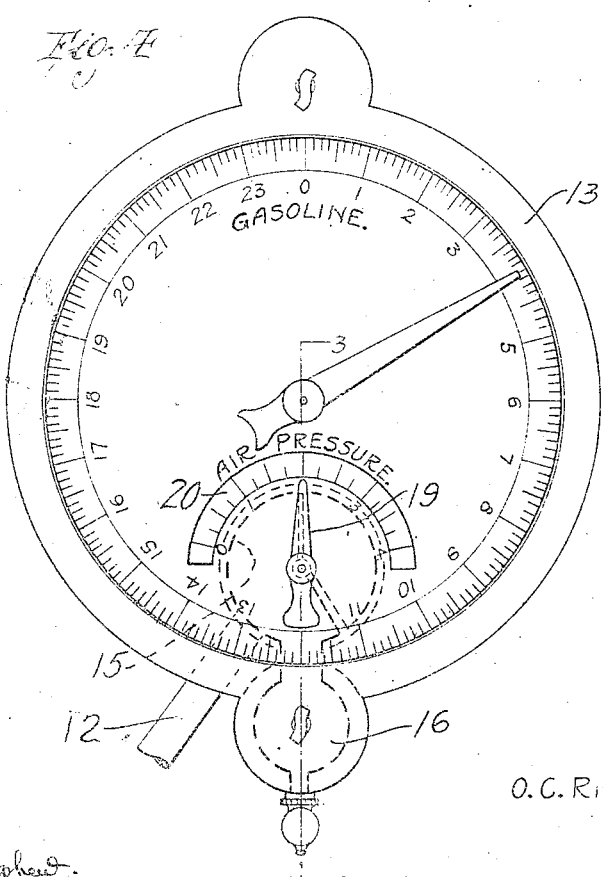
Witnesses
Robert M. Sutphen
A. I. Fried
Inventor
O. C. Ritz-Woller.
By Watson E. Coleman
Attorney

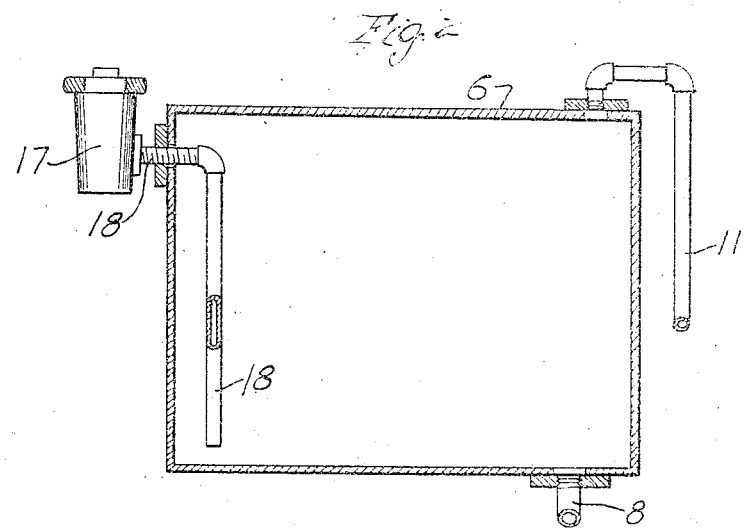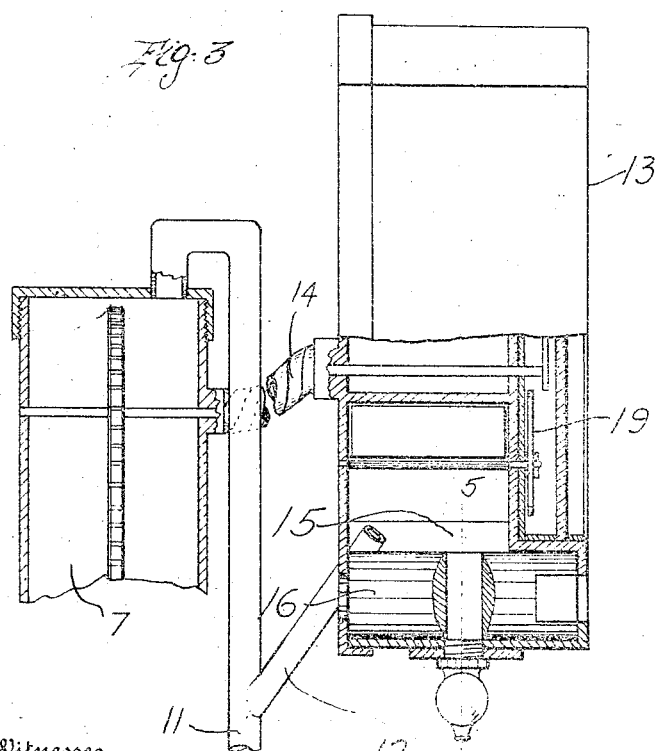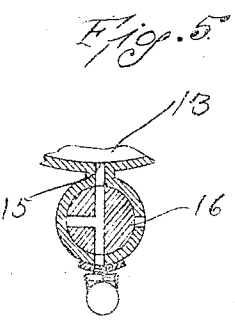

UNITED STATES PATENT OFFICE.

OLIVER C. RITZ-WOLLER, OF JACKSONVILLE, FLORIDA.

GASOLENE-FEED SYSTEM FOR MOTOR-VEHICLES.

1,097,365.  Specification of Letters Patent.  Patented May 19, 1914.

Application filed April 19, 1913. Serial No. 762,422.

*To all whom it may concern:*

Be it known that I, OLIVER C. RITZ-WOLLER, a citizen of the United States, residing at Jacksonville, in the county of Duval and State of Florida, have invented certain new and useful Improvements in Gasolene-Feed Systems for Motor-Vehicles, of which the following is a specification, reference being had to the accompanying drawings.

This invention relates to an improved gasolene feed system for motor vehicles and has for its primary object the provision of a simple, efficient and highly reliable apparatus whereby the refilling of the supply tank may be effectually prevented and the use of the gasolene contained in the tank placed under the absolute control of the owner of the machine so that the same cannot be operated by unauthorized persons.

Another and more specific object of the invention resides in the provision of a supply tank suitably mounted upon the body of the vehicle and having a filling tube extending within and adjacent the bottom of the tank, a pipe line connecting the tank to the carbureter of the machine, an air pipe connected to the top of said tube and tank, and a branch pipe connected to the air pipe provided with an outlet cock which may be locked or unlocked by the operator to release the air or confine the same within the upper end of the tank and gage tube.

It is a further object of my invention to produce a fuel supply or feed system for automobiles or similar vehicles which consists of few parts of simple form and therefore capable of manufacture at small cost, and which coöperate to produce an apparatus which will be highly efficient, reliable and serviceable in practical use.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a side elevation showing an automobile or other motor vehicle in outline having my invention applied thereto: Fig. 2 is an enlarged section of the supply tank showing the feed pipe and air tube connections: Fig. 3 is an enlarged view of the upper end of the gage tube having the air pipe connected thereto showing one arrangement of the branch pipe and its connection with a valved pocket or chamber provided in the casing of an indicator. Fig. 4 is a front elevation of the indicator. Fig. 5 is a section taken on the line 5—5 of Fig. 3.

Referring in detail to the drawing, 5 designates an automobile or other motor vehicle which may be of any ordinary or approved construction. Upon the rear end of the body of this vehicle, the gasolene supply tank 6 is mounted in any preferred manner.

7 designates a gage tube suitably mounted upon the forward end of the vehicle body, and the lower end of this tube is connected by means of the pipe line 8 with the lower end of the supply tank 6. A pipe 9 also leads from the lower end of the gage tube to a carbureter indicated by the numeral 10. The upper ends of the supply tank and gage tube are connected by an air conducting pipe 11 through the medium of which the air pressures in the upper ends of the tube and tank above the body of liquid contained therein are equalized. This air pipe 11 is provided at a point adjacent its connection to the gage tube 7 with a branch 12.

13 designates an indicator arranged in a suitable position so that the dial face thereof may be conveniently read by the operator, the mechanism of said indicator being actuated by a flexible shaft 14 which connects the same to a sprocket shaft arranged in the upper end of the gage tube. As the particular construction of this indicator and operating means therefor constitutes the subject matter of another copending application, filed February 27, 1913, Serial No. 751,133, the same will not be referred to in detail in the present specification. It will suffice to state that for the purpose of carrying out the present invention, I provide the indicator casing with an air receiving pocket or chamber 15, to which the branch pipe 12 from the main air pipe 11 is connected. This chamber is provided with a valve or cock 16, the same being provided with a key way to receive a key in the possession of the owner of the car so that said valve can be readily opened or closed when desired to release the air from the upper end of the gage tube or supply tank or permit the same to accumulate therein.

The supply tank 6 is provided with a filling nozzle 17, said nozzle being provided with a tube 18 extending into the tank and terminating adjacent the bottom thereof. Air is supplied to the tank 6 by means of a suitable pump indicated at 20. The air receiving chamber 15 of the indicator 13 is provided with a gage or indicator whereby the air pressures in the supply tank and gage tube may be ascertained. This gage includes a suitable pointer 19 mounted upon the dial plate of the indicator 13 and movable over a graduated scale 20 provided upon the face of said dial plate.

Having now described the apparatus whereby I propose to put my invention into practical operation, the operation of the same will be understood as follows: Assuming that the tank 6 contains a quantity of gasolene, if the cock or valve 16 is closed, and the cap is removed from the filler 17, the pressure of air in the upper end of the tank 6 will force the gasolene upwardly in the tube 18 and out of the filling nozzle. It will thus be apparent that the tank 6 cannot be resupplied with gasolene until the cock or valve 16 is opened to release the air contained in the tank 6 and tube 7. The gasolene being fed to the carbureter by the pressure of air in the tank 6 above the body of fluid contained therein, it will be obvious that so long as the valve or cock 16 is open, there will be no positive feed of the fuel to the carbureter. Thus the machine cannot be operated. The owner of the machine is thus at all times assured that the same will not be used during his absence and liability of injury thereto as well as extravagant use of the gasolene, is obviated.

From the foregoing, it is believed that the construction, operation and several advantages of my improved feed system for motor vehicles or the like will be clearly and fully understood.

The invention is simple, highly reliable and durable and efficient in practical operation and may be produced and installed upon motor vehicles of all types at comparatively small manufacturing cost.

Having thus described the invention, what is claimed is:

1. A fuel feed system of the character described comprising in combination, a fuel supply tank, a gage tube, a liquid conducting pipe connecting the lower ends of said tank, and tube, an air pipe connecting the upper ends of the tank and tube, a filling nozzle for the tank, a pipe connected thereto opening at its lower end adjacent the bottom of the tank, and a valve to open communication between the air pipe and the atmosphere whereby the pressure of air in the tank is released, or to close such communication and prevent refilling of the supply tank.

2. A fuel feed system of the character described comprising in combination, a fuel supply tank, a liquid conducting pipe extending from the bottom of the tank, a gage tube to which said pipe is connected, an air pipe connecting the upper ends of said supply tank and gage tube to equalize the air pressures therein, an air pressure indicator including an air receiving chamber, a branch pipe connecting said air pipe to said chamber, a filling pipe for the supply tank extending into the same adjacent the bottom thereof, and a lock valve for said air chamber adapted to be opened or closed by the operator to simultaneously release the air from the supply tank and gage tube whereby feed of the liquid fuel is prevented.

In testimony whereof I hereunto affix my signature in the presence of two witnesses.

OLIVER C. RITZ-WOLLER.

Witnesses:
M. H. DANCY,
E. L. CROSSER.